United States Patent [19]

Regueiro

[11] Patent Number: 5,417,189
[45] Date of Patent: May 23, 1995

[54] HIGH SPEED INDIRECT INJECTION DIESEL ENGINE

[75] Inventor: Jose F. Regueiro, Rochester Hills, Mich.

[73] Assignee: Chrysler Corporation, Highland Park, Mich.

[21] Appl. No.: 160,646

[22] Filed: Dec. 2, 1993

Related U.S. Application Data

[63] Continuation-in-part of Ser. No. 28,064, Mar. 8, 1993, Pat. No. 5,309,879.

[51] Int. Cl.$^6$ .................. F02B 19/08; F02B 19/18; F02F 3/24
[52] U.S. Cl. .................. 123/262; 123/286; 123/269
[58] Field of Search .......... 123/262, 263, 264, 284, 123/286

[56] References Cited

U.S. PATENT DOCUMENTS

| | | | |
|---|---|---|---|
| 3,259,116 | 7/1966 | Bricout | 123/286 |
| 3,406,667 | 10/1968 | Evans et al. | 123/286 |
| 3,945,365 | 3/1976 | Regueiro | 123/191 |
| 3,965,872 | 6/1976 | Taira et al. | 123/262 |
| 3,989,015 | 11/1976 | Rivere | 123/286 |
| 4,005,684 | 2/1977 | Habu | 123/284 |
| 4,006,720 | 2/1977 | Sato et al. | 123/284 |
| 4,111,177 | 9/1978 | Regueiro | 123/32 ST |
| 4,195,597 | 3/1980 | Hofbauer et al. | 123/262 |
| 4,323,039 | 4/1982 | Tsugekawa et al. | 123/286 |
| 4,444,166 | 3/1984 | Kovacs et al. | 123/262 |
| 4,635,598 | 1/1987 | Tanaka et al. | 123/286 |
| 4,785,776 | 11/1988 | Tokura et al. | 123/262 |
| 4,798,183 | 1/1989 | Hataura et al. | 123/286 |
| 5,024,194 | 6/1991 | Shinzawa et al. | 123/269 |
| 5,067,457 | 11/1991 | Shinzawa | 123/269 |

OTHER PUBLICATIONS

*Automotive Industries*, John McElroy, "Alternative Engines", Jan. 1980, pp. 43–48.
*Technology Review*, John Heywood and John Wilkes, "Is There a Better Automobile Engine?", Nov./Dec. 1980, pp. 19–29.
*Automotive Engineering*, Stuart Birch, Jack Yamaguchi, Al Demmier & Kevin Jost, "Vehicles/Engines", Jun. 1992, vol. 100, No. 6, pp. 46–47.
*Diesel & Gas Turbine Worldwide Catalog*, 1985 Edition vol. 50, pp. 1268, 1315, 1319, 1321.

*Primary Examiner*—Henry C. Yuen
*Assistant Examiner*—Thomas N. Moulis
*Attorney, Agent, or Firm*—Kenneth H. MacLean

[57] ABSTRACT

A diesel engine (10) has a pre-combustion chamber (30) with an angled and tapered transfer passage (60) leading to the main combustion chamber (44). The transfer passage (60) is tapered to provide a larger lower end (62) facing the main chamber (44) and smaller upper end (64) facing the pre-combustion chamber (30). Air passing through the passage (60) during the compression stroke undergoes heating and swirling within the pre-combustion chamber. The piston has an upper surface (46) with recessed lobes (20) and (22) and recessed passage area (28). Each recessed lobe functions as a valve pocket for the respective intake valve (32) and exhaust valve (42). The valve pockets are deep enough to provide sufficient valve lifts to allow valve overlap periods comparable with spark ignition gasoline engines without interfering with the piston upper surface (46).

25 Claims, 3 Drawing Sheets

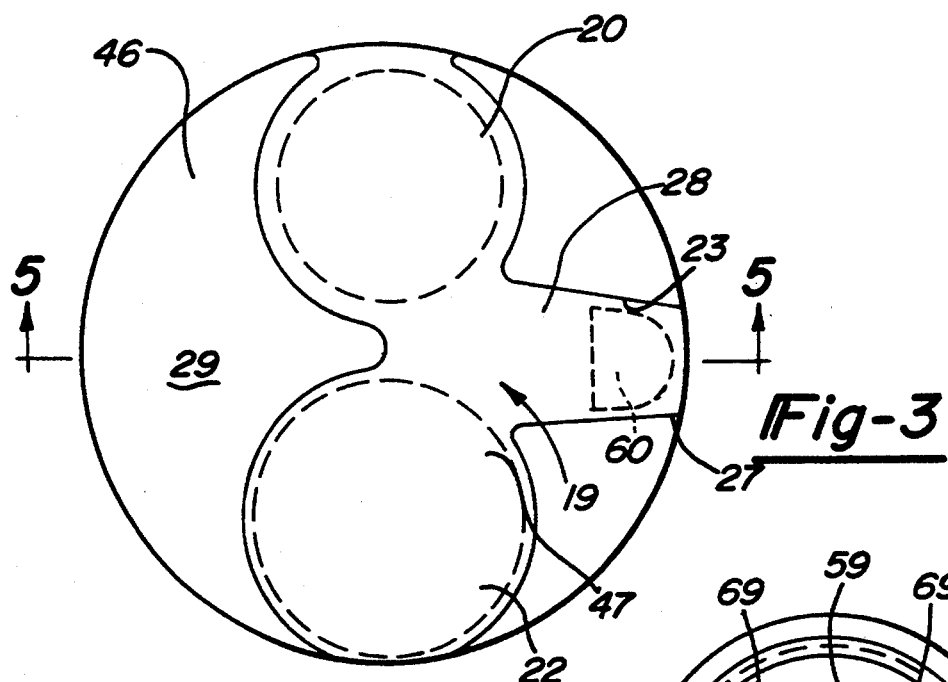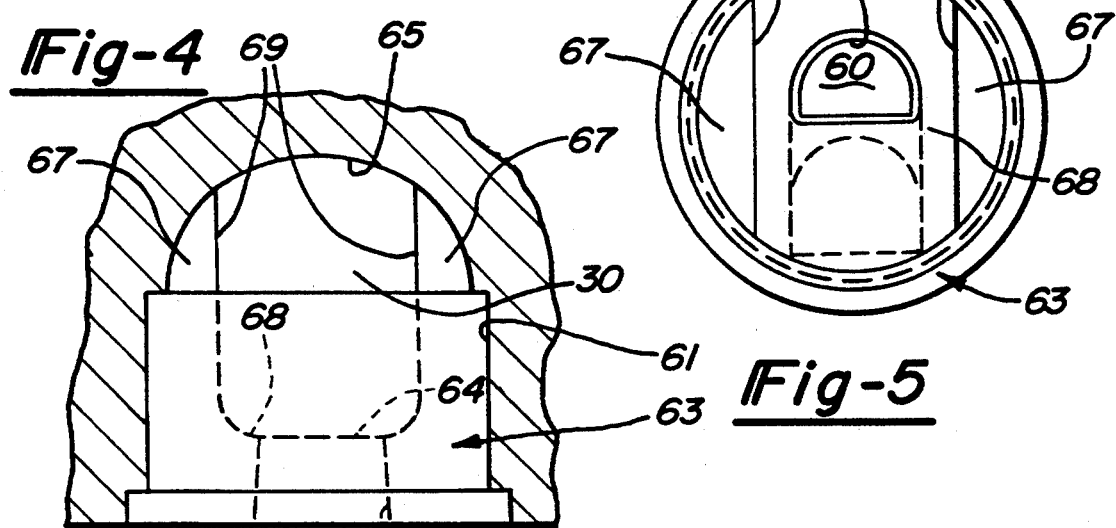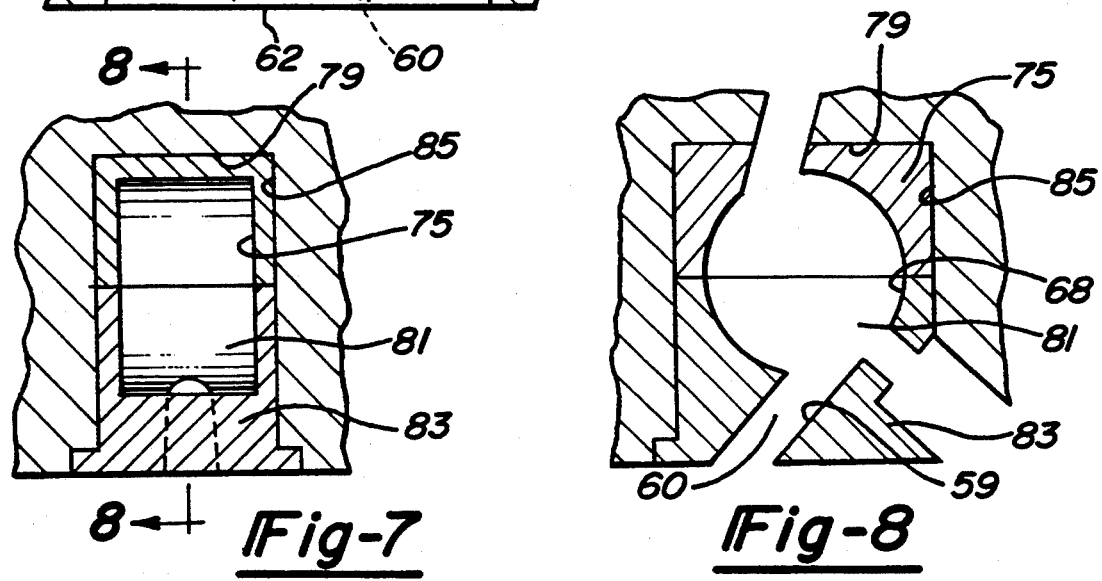

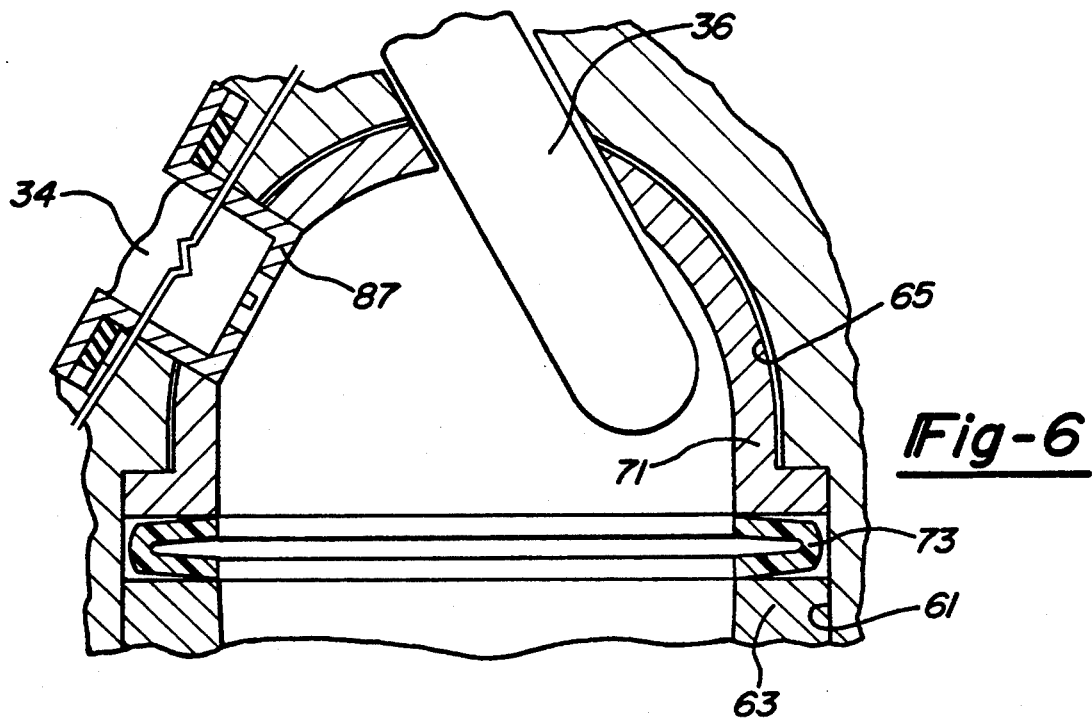
Fig-6
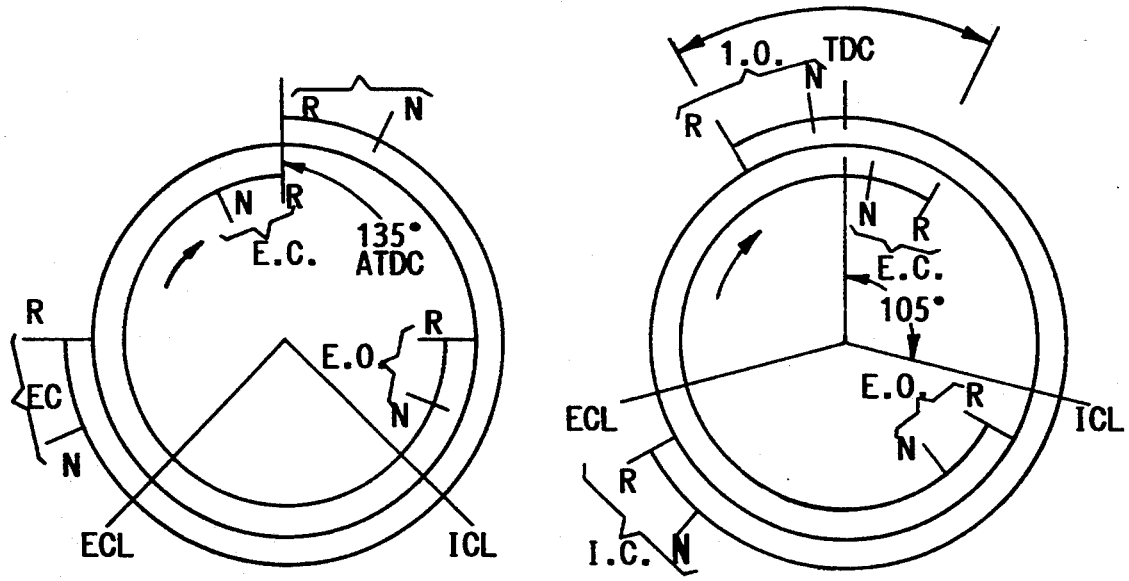
Fig-9
*PRIOR ART*
Fig-10

HIGH SPEED INDIRECT INJECTION DIESEL ENGINE

This application is a continuation-in-part of application U.S. Ser. No. 08/028,064, filed by the inventor on Mar. 8, 1993, now U.S. Pat. No. 5,309,879.

TECHNICAL FIELD

The field of this invention relates to internal combustion engines and more particularly to diesel engines having a pre-combustion chamber and a piston with recessed pockets.

BACKGROUND OF THE DISCLOSURE

High speed automotive diesel engines capable of 4500 to 5000 r.p.m. that have been in mass production are the Daimler-Benz engine or variations of the Ricardo "Comet" design. The engines have all been 2 valves; OHV or OHC design. Diesel engines have their own distinctive complications due to the high compression ratios needed to run these engines.

Valve lift near or at top dead center of the piston is nil due to the small clearance between the valves and the piston at top dead center (TDC) to prevent hitting of the valve into the piston. Because of manufacturing tolerances, both the intake and exhaust valve are designed to be effectively closed at piston top dead center.

The valve lift is adversely affected at the critical valve overlap period when the intake valve is beginning to open and the exhaust valve is closing. The limitation of valve lift at this time affects the thorough flushing of the exhaust gases and inhibits the cylinder filling process for the subsequent cycle. The reduced valve lift during the overlap period, and the long valve periods necessitate a late intake closing and an early exhaust opening. A late intake valve opening and closing reduces the effective compression ratio with detrimental starting and running consequences, and greatly reduces the trapped volumetric efficiency and compression temperature at low speeds. An early exhaust valve opening wastes energy and raises the exhaust gas and exhaust valve temperature which forces the use of more expensive and exotic high temperature valve and seat materials.

An early exhaust closing raises the probability of a recompression spike, or "lock-up" at TDC during the scavenging or overlap portion of the cycle at high speed and high load, when in some engines, there is not sufficient real time available for a complete evacuation of the exhaust gases. Recompression spikes, apart from inhibiting the proper gas-flow process and reducing volumetric efficiencies and power output consume energy by creating negative work on the exhaust stroke near TDC. The exhaust valve closing must occur late enough during an extended overlap period with the intake valve to prevent a recompression spike near top dead center.

Diesel engines have been able to tolerate these problems at low speeds. The operation at low speed provides sufficient time for the air flow through the intake and exhaust valves to pass into and out of the cylinder even with a delayed intake valve opening or early exhaust valve closing. However, the problems associated with valve timing and air flow lag become magnified at high speeds. The combination of a late intake opening and an early exhaust closing provides for increased risk of a recompression spike at high speed operation. However the high compression ratios of a conventional high-speed I.D.I. diesel engine with the piston at top dead center being very close to the valves dictate that the intake valves cannot be opened early due to crashing into the piston and the exhaust valve cannot be closed late due to the crashing of the piston into the exhaust valve. The unnatural valve timings detract from the potential high-speed capability of the diesel engine.

A major compromise of these prior-art high-speed, 2-valve engines results when the intake valve opening must be delayed until the piston reaches TDC. In every case, the intake valve closes excessively late in the compression stroke, and the effective compression ratio, effective compression pressure and effective compression temperature are too low even for the high speeds.

When such engines run at low speeds, the same applies, but in addition, the volumetric efficiency suffers because the upward piston motion on the compression stroke "spit-back" into the intake manifold the air which has already been admitted into the engine and for which energy has been spent. Negative work (more energy wasted) also results from returning certain amounts of this already-admitted air back into the intake manifold. The situation is further aggravated at cranking speeds, especially cold when the batteries are weak and the oil is thick and said speeds are in the order of 100–150 rpm. The effective compression pressure and temperature under said conditions is lowered so much that cold startability is greatly affected or impossible.

The lower effective compression ratios are also the main reason why diesels have the distinctive knock when they idle. The compression of the air charge does not achieve ignition temperature conditions until late in the cycle when all fuel from the injector has been introduced into the combustion chamber. The ignition results in an uncontrolled explosion of all the fuel, practically at the same time, with the resulting distinctive diesel bang or knock. A combustion process is desired in which higher compression temperature is achieved at points near piston TDC. The incoming injected fuel will ignite in a shorter period of time (chemical delay time), achieving ignition after only a smaller portion of the fuel charge is injected and burning the remaining portion of the fuel in a controlled manner as injection proceeds, producing not only a smoother, quieter combustion, but also lower firing pressures and $NO_x$ levels.

Certain designs have unsuccessfully attempted to overcome the problems of the close approach of the piston to the cylinder head. Some engineers have attempted to sink the valves into the cylinder head. This design has been unsuccessful. Firstly, the cylinder head shrouds the opening of the valve such that inadequate air flow results when the valves are beginning to open. If the cylinder head is cut back to eliminate the shroud, the size of the combustion chamber is then increased which undesirably lowers the compression ratio.

Modifications to pistons have also increased efficiency of engines. Many engines have a piston with a recess to form part of the combustion chamber or to enhance air swirl. The "Comet" diesel engine have a "spectacle-shaped" recess in its piston to form the main active combustion chamber. The chamber is not aligned or coordinated with the valves to act as a pocket to increase the clearance between the valves and the piston at TDC. Nissan has developed an engine in which valve pockets exist in the piston. The pockets allow the valve heads to protrude into the combustion chamber (rather than into the head) to eliminate the air flow shrouding effects at low valve lifts.

Divided combustion chambers, also referred to as indirect injection engines, have a separate "pre-combustion chamber" or "pre-chamber" as it is generally known, in direct communication with the cylinder through at least one passage. Air enters it from the cylinder during the compression stroke. The fuel is injected into the pre-chamber towards the end of the compression stroke as the piston nears TDC. The fuel mixes with the highly turbulent air in the pre-chamber at high velocity created by the passage of air through the relatively small transfer passage. After an appropriate delay period, the fuel ignites and the mass of burning fuel and air is then expelled back into the main chamber at high velocity where it mixes with the rest of the air in the main chamber for the main combustion phase.

Two advantages occur with pre-chamber designs. Firstly, the tail ends of injection are assimilated much better by indirect injection designs. The tail ends of fuel injection often results in large size droplets. The large size droplets have less surface area in which to mix with air in order to completely burn. To further complicate matters, the large size droplets also have less time to completely burn because they are the last of the fuel to be injected. As such the inadequacies of the fuel injector cause much soot and smoke by incompletely burning the tail ends in an open chamber design. The pre-chamber design more completely breaks up the large droplets from the tail ends of injection by the intense air mixing in the pre-chamber and the very high temperatures within the pre-chamber. In the early days of the diesel engine, when "solid" fuel injection by mechanical means was introduced, divided chamber engines made possible the application of compression-ignition principles to relatively small engines, such as trucks and buses. Part of the reason was because of the second advantage of pre-chambered engines: the ability to run at speeds higher than was then customary with bigger industrial or marine engines. The pre-combustion chamber design of the time, by violently mixing and quickly burning the fuel, in spite of the very poor ignition characteristics of the fuel systems of the time, allowed engines to run up to 1500 rpm; sometimes 1800 rpm, which made possible the introduction of smaller cylinder sizes (down to 2 liter/cylinder) typical of truck and bus engines, and later, cylinder sizes of less than 1 liter which first allowed diesel engine installation in passenger cars, small boats, and small construction equipment.

However, divided chamber designs have certain inherent drawbacks. Firstly, the separate pre-chamber increases the overall surface to volume ratio of the hot part of the combustion chamber thus increasing the thermal losses which increases fuel consumption. Secondly, the pumping of the gases into the pre-chamber and out of the pre-chamber costs energy. Thirdly, the high heat losses must be compensated in order to achieve self ignition temperature of the fuel, especially during engine start-up. These drawbacks are addressed in the form of higher compression ratios. Pre-chamber designs often are approximately 22.5:1. The high compression ratios require extremely close manufacturing tolerances in all the major engine components. Even slight variations can have gross and detrimental effects on the nominal compression ratio of the engine. In practice, the tolerances may cause significant differences from engine to engine and, within the same engine, from cylinder to cylinder causing uneven and rough performance. Another disadvantage of divided chamber engines is that the torch-like jet of flame exiting the pre-chamber and entering the main combustion chamber would in some cases impinge directly on the piston top at or near TDC. Special measures such as the use of high temperature steel heat dams on the piston tops, or oil cooling jets shooting oil into the bottom of the piston to cool down the piston temperature coated by the very hot flame jet add to the expense and complication of the diesel engine. Even with these measures, many piston tops undergo heat checking and thermal cracking.

What is needed is a high-speed diesel engine with highly improved power output with lower fuel consumption, improved startability and reduced combustion noise and harshness, and offering increased durability of valves and piston. The process takes advantage of, and is based on, appropriate recesses incorporated in the piston which, apart from functioning as active combustion chambers, also provide for valve pockets to receive the intake and exhaust valves for unique and improved valve timing without combustion or manufacturing compromises, and which contribute to an even thermal loading. The combination of volumetric efficiencies and valve timings providing previously unheard of startability, smooth, quieter combustion and reduced firing pressures, even while producing increased power outputs.

SUMMARY OF THE DISCLOSURE

In accordance with one aspect of the invention, an internal combustion engine has a cylinder and a piston reciprocally movable in the cylinder. A cylinder head is secured over the cylinder and piston to form a combustion chamber. An intake port extends through the cylinder head and an intake valve is mounted at the port through the cylinder head for allowing air to be admitted into the combustion chamber. An exhaust port extends through the cylinder head and an exhaust valve is mounted to the cylinder head for allowing exhaust gases to exit the combustion chamber. A pre-combustion chamber is in communication with the combustion chamber and preferably houses a heating element such as a glow plug for cold starting and a fuel injector.

The pre-combustion chamber has a tapered transfer passage communicating with the combustion chamber. The passage has a narrow open end facing the pre-combustion chamber and a wide open end facing the combustion chamber. The tapered transfer passage has a longitudinal axis acutely angled with respect to an upper surface of said piston.

In accordance with another aspect of the invention, the piston has a recess in a top surface thereof. The recess has a valve receiving section being sized to fit the respective intake and exhaust valve when said respective valve being in a partially open position and when said piston is at or near TDC. The recess includes a passage section that extends from the valve receiving section to a position in proximity directly under the wide open end of the transfer passage to receive gases exiting the pre-combustion chamber through the transfer passage and to deliver the gases to the valve receiving section. The passage section is tapered with its wide end in proximity to the valve receiving section and the narrow end positioned below the transfer passage of the pre-combustion chamber. This passages, of course, also function during the compression stroke by facilitating the movement of air from the cylinder into the pre-combustion chamber.

Preferably, the valve receiving section includes a plurality of lobes with each lobe sized to fit a respective intake and exhaust valve when the respective valve is in a partially open position and when said piston is at or near TDC. The lobes have a rounded apex section interposed therebetween for dividing gas flow from the passage section into two swirling gas flows, one swirling gas flow being directed into one lobe and swirling in one direction and a second swirling gas flow being directed into the other lobe and swirling in an opposite direction from said direction in said one lobe.

In accordance with another aspect of the invention, the pre-combustion chamber has a circular cross-sectional periphery and substantially flat side walls. The tapered transfer passage has its narrow open end connected through said circular periphery. In one embodiment, the pre-combustion chamber can be defined in part by a cup insert. The cup insert preferably includes two upright flanges that define the flat side walls of said pre-combustion chamber. The cup insert is received in a bore in the cylinder head. In anther embodiment, the cup insert has flat exterior walls and therefore narrower for easier installation and less usage of space which must be shared with at least one of the valve ports. The glow plug and fuel injector are operably mounted in the pre-chamber. The fuel injector mounted at an angle from 30° up to 130° approximately from the vertical axis of the engine cylinders. In one embodiment, the fuel injector is mounted such that its nozzle is higher than its inlet, i.e., it is mounted at an angle greater than 90° from the vertical.

In accordance with another aspect of the invention, the intake valve is operably mounted in the engine to open when the piston is approximately 30° or slightly more before top dead center and has a real duration of approximately 270°. Similarly, the exhaust valve is operably mounted in the engine to open at approximately 120° after top dead center and to close when the piston is approximately 30° or slightly more after top dead center for the real open duration being approximately 270°.

BRIEF DESCRIPTION OF THE DRAWINGS

Reference now is made to the accompanying drawings in which:

FIG. 3 is a top plan view of the piston shown in FIG. 1;

FIG. 4 is a side elevation view of the pre-chamber cup insert 90° rotated from the position shown in FIG. 1;

FIG. 5 is a top plan view of the cup insert shown in FIG. 4;

FIG. 6 is a cross-sectional side elevational view of alternate cylinder head cavity for pre-chamber construction;

FIG. 7 is a cross-sectional side elevational view of another alternate embodiment of the pre-chamber;

FIG. 8 is a cross-sectional view taken along lines 8—8 shown in FIG. 7;

FIG. 9 is a schematic graph illustrating the opening and closing cycles of the valves with respect to crankshaft angle in prior art diesel engines; and FIG. 10 is a schematic graph illustrating the opening and closing cycles of the valves with respect to the crankshaft angle in accordance with the invention.

DETAILED DESCRIPTION OF THE PREFERRED EMBODIMENT

Figure 1:
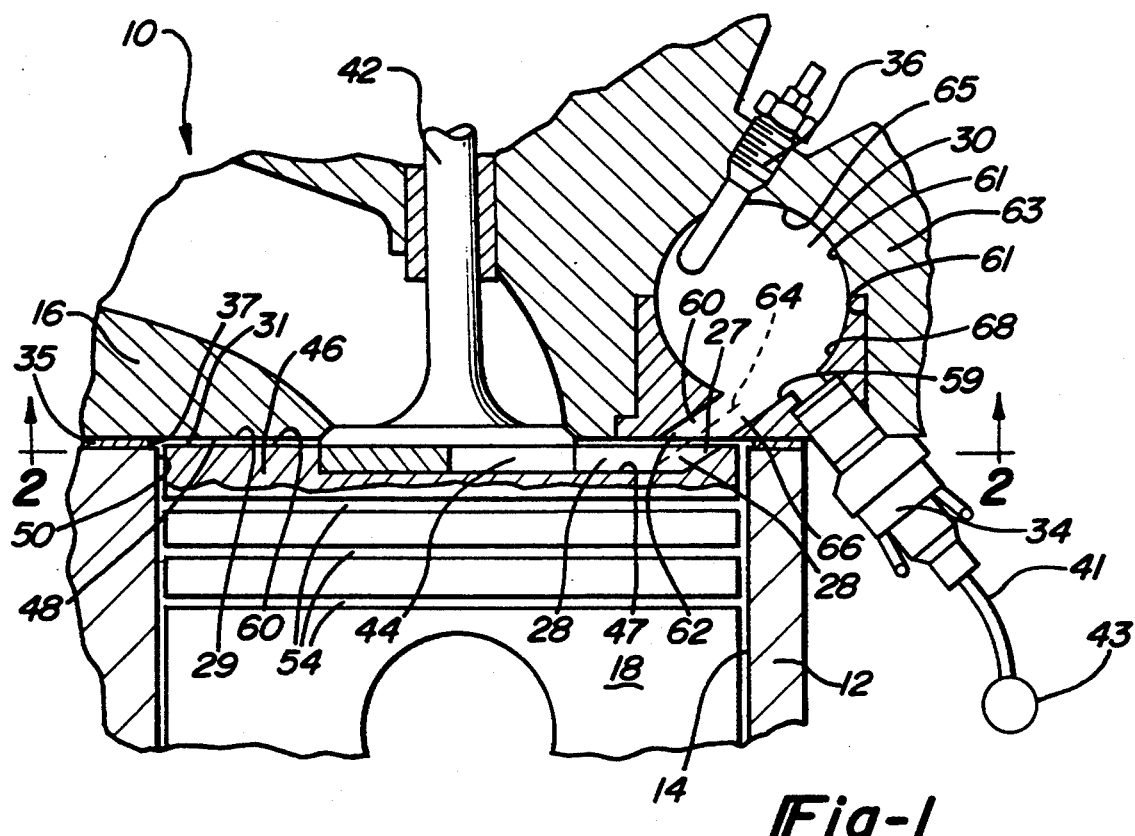
FIG. 1 is a segmented side elevational view of a cylinder and piston assembly for a diesel engine illustrating an embodiment of the invention.

Referring now to FIG. 1, an internal combustion engine 10 includes a cylinder head 16 and an engine block 12 with at least one cylinder 14 and at least one piston 18. Only one cylinder 14 and piston 18 are shown with the understanding that any other cylinder and piston in the engine 10 are substantially identical in structure and function, and therefore, are not individually described. The cylinder head 16 is mounted on block 12. Each piston 18 is conventionally connected to a crankshaft through piston pins and connecting rods. The crankshaft is connected via a timing mechanism (gears, chains or belts) to a camshaft that operates the intake valves 32 and exhaust valves 42. The piston rods, crankshaft, timing mechanism, camshaft and other valve train components have conventional construction and therefor for simplicity of the drawing are not illustrated. The cam lobes on the cam shaft can have the same conventional profile but are rotated from conventional positions to time the opening and closing of the intake valve and exhaust valves as described below.

An intake valve 32 and exhaust valve 42 are associated with each cylinder 14. Reference to direction such as top, bottom, up, down, vertical, or horizontal will be made relating to the engine and the longitudinal axis of the cylinder as shown in FIG. 1 with its conventional arrangement for a motor vehicle. It should be understood that the engine itself may be repositioned or reoriented such as rotated about its longitudinal or transverse axis without affecting the invention.

Figure 2:
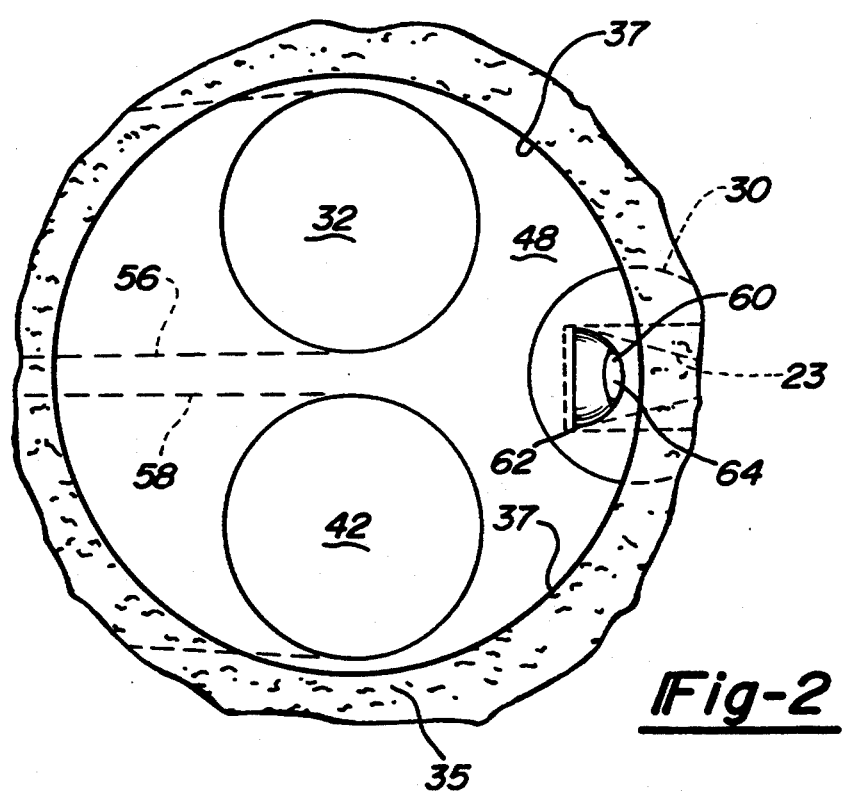
FIG. 2 is a fragmentary bottom plan view of the cylinder head.

The cylinder 14, piston 18, and cylinder head 16 form a combustion chamber 44. The piston 18 has a top surface 46 that defines the bottom wall 46 of the chamber 44. The cylinder head 16 forms a top surface 48 of the chamber 44. The cylinder 14 forms the side wall 50 of chamber 44 when the piston has proceeded downward from its top dead center position shown in FIG. 1. The piston 18 has a ring pack 54. As shown in FIG. 2, the cylinder head 16 has intake port 56 and exhaust port 58 in communication with the respective intake valve 32 and exhaust valve 42. A conventional gasket 35 is interposed between the cylinder head 16 and engine block 12 with cutouts 37 aligned over the cylinder 14.

As shown in FIGS. 1 and 3, the piston surface 46 has an outer flat periphery 29 that conforms to the flat shape of the head 16 and has a valve receiving recessed area 19 with two lobes 20 and 22 positioned to be directly under valves 32 and 42 respectively. The piston periphery section 29 forms a squish area 31 of the combustion chamber 44 with the surface 48 of cylinder head 16. The squish area 31 allows more volume to be adjudicated to the lobes 20 and 22 and promotes higher compression ratios as the piston reaches TDC on its compression stroke for the start of combustion.

The lobes 20 and 22 function as valve pockets and as part of the combustion chamber. The recessed lobe 20 is located and sized to receive the intake valve 32 when the valve is in the partially open position and the piston 18 is near TDC. The recessed lobe 22 is located and sized to receive the exhaust valve 42 when the valve 42 is in the partially open position and the piston 18 is near TDC.

It is desired that the recessed lobes share a common flat bottom surface 47 at equal depth. Each recessed lobe 20 and 22 are joined with a common recessed passage section 28 also having the same or deeper depth of common bottom surface 47. The passage section 28 is tapered by diverging walls 23 with its wider section 25 adjacent the lobes 20 and 22 and the narrower end 27 aligned under a lower end 62 of a transfer passage 60 as described in more detail below.

A pre-combustion chamber 30 is located above main combustion chamber 44 toward a periphery of the cylinder. The chamber 30 has a conventional fuel injector 34 operably mounted thereto. A conventional glow plug or other type of heating element 36 is also operably mounted to the pre-combustion chamber 30. The fuel injector 34 is mounted outboard of the glow plug 36 and at a substantial angle from the vertical, up to approximately 120°-130° from the vertical. Such an angle reduces the high-pressure line 41 length with respect to traditionally placed fuel pumps 43 that are positioned outboard and below the injectors. The glow plug 36 can then be mounted inboard of the fuel injector 34 at any angle deemed optimum for ignition with minimum interference with the air flow into or out of the pre-chamber.

The pre-combustion chamber 30 can be formed by a cavity 61 machined into the cylinder head and an insert cup 63 positioned in the appropriately machined cylindrical cavity of the cylinder head 16. The insert cup can be made of special grades of high-temperature resistant steel alloys or suitable ceramic material. The pre-combustion chamber 30 has a generally disc like shape with circular peripheral wall 68 with circular cross-sections along the vertical direction and flattened side walls 69. As shown in FIG. 1, the cavity 61 itself may form part of the chamber upper wall 65. The insert cup 63 as shown in FIGS. 4 and 5 may have two upright flanges 67 that have flattened inner walls 69 that form the side walls of the chamber, should the upper chamber cavity be machined as part of a sphere. In an alternate embodiment, as shown in FIGS. 7 and 8, the upper cavity 83 itself may be machined in a rectangular fashion and an upper insert member 75 of also generally flat rectangular outside wall 77 and flat top 79 with a semi-disc shaped interior cavity 81 can be installed above a lower insert 83 of similar construction. The inserts 75 and 83 can be made from ceramics to minimize heat loses out of the chamber as well as to reduce erosions from fuel impingement by the fuel plume emerging from the fuel injector. The upper insert 85 and lower insert can also be made of stainless steel to reduce erosion and affect some control of heat transfer, especially with injectors positioned at more than 90° from the vertical as shown in FIG. 1.

A transfer passage 60 passes through the lower section 37 of the cup 63 to the main combustion chamber 44. As shown in FIG. 2 and 3, the transfer passage 60 has its horizontal direction being aligned with the longitudinal axis of the passage section 28 win piston 18. The passage 60 is tapered with its open lower end 62 that faces the main chamber 44 being larger than the open upper end 64 facing the pre-combustion chamber 30. The tapered passage 60 allows a greater jet swirl of air in the pre-chamber with a reduced pressure drop in passage 60. Upon the power stroke, there is reduced pressure losses of the outgoing gases from the pre-chamber to the main chamber with the flame torch being relatively more diffused for better entry into the combustion pockets 20 and 22 and creating less destructive impingement upon splitter point 72.

The peripheral wall 59 of the passage 60 at upper end 64 is angled and positioned such that it is approximately tangential with the circular peripheral wall 68 of the pre-combustion chamber 30. The longitudinal axis 66 of a respective passage 60 at the lower end 62 is angled and positioned to form an acute angle with the flat bottom surface 47 in the recessed area 19 of the piston.

Another alternate pre-chamber construction is illustrated in FIG. 6. In this embodiment the upper surface 65 of the bore 61 is lined with a stainless steel liner 71. The liner fits against the cup insert 63 with a stainless steel seal 73 interposed therebetween. A second stainless steel heat shield 87 is installed about the fuel injector 34. This way of lining the upper pre-chamber cavity is effective with either a circular or a spherical (Ricardo) pre-chamber and this application is intended to offer coverage on those designs as well.

In operation, at the end of the exhaust stroke and the beginning of the intake stroke, both the exhaust valves 42 and intake valves 32 may be partially opened during an overlap period. At this time, the piston 18 is at or near TDC and its periphery 29 forms squish area 31 with the upper chamber surface 48. The opening of the valves during the piston approaching TDC is possible because the intake valve 32 fits within lobe 20 and exhaust valve 42 fits within lobes 22.

With the construction in accordance with this invention, the timing of the intake valve is such that its real opening position is set earlier in the crankshaft cycle then for existing Ricardo type pre-combustion chamber engine and for all those that have been built since 1927 following Ricardo's designs. As shown in FIG. 7, the timing of the intake valve can be set approximately to begin opening at 30° before top dead center position of the crankshaft and piston. Using a conventional cam shaft with standard profile cam lobes, the intake valve 32 will also close earlier. The conventional open duration lasts approximately 270° such that the its real closing occurs at approximately 240° after top dead center. The earlier closing of the intake valve as compared to prior art valve timing increases the effective compression ratio for greatly improved ignition and cold startability, and also, at low speeds and during starting, prevents loss of air from the cylinder back into the intake manifold, which not only increases the volumetric efficiency but also the effective compression temperature of the air at the point of injection prior to TDC, decreasing the real time required by the fuel to reach auto-ignition temperature, affecting ignition at a point where there is less fuel injected in the chamber or allowing the timing of the beginning of injection be retarded, which results in much quieter and effective combustion with lower production of $NO_x$, HC, smoke and particulates.

By definition, during the intake stroke, the intake valve 32 is fully open at the center line of the valve lift curve. With the valve timing set to open at 30° before top dead center, the center line and full open position can be typically advanced to a crankshaft angle of 105°, as opposed to prior art pre-combustion chamber engine where such centerline occurs typically at much later timings as per example illustrated at 135° ATDC in FIG. 8. By advancing the valve events, the valve 32 is fully open near the pistons fastest motion. In prior art, the valve is fully open much after the piston has peaked in speed and is already slowing down. The piston speed reaches its maximum at approximately 80°-82°. Conventional valve lift during the maximum piston speed at the 80°-82° angle is nowhere near its maximum which provides for a throttling effect of air entering the cylinder By advancing the valve timing approximately 30° the valve lift reaches its maximum at approximately 105°. As such, during the pistons maximum speed, the valve is lifted much more because it is much closer to its maximum lift. This better matching of piston maximum speed with the maximum lift of the intake valve lessens air resistance to provide increased amounts of air to enter the cylinder and increase the volumetric efficiency of the engine. Valve timings such as those used by prior art pre-combustion chamber diesels are unique to such designs, and are unnatural for engines of similar displacement operating at similar speeds. Comparable gasoline engines operate at valve timings much closer to those resulting from the teachings of the present invention than to those of prior art pre-chamber diesel engines.

During the compression stroke, as the air is compressed, some of the air passes through the passage 60 into pre-combustion chamber 30. The air is heated. Firstly, compression process heats the air. Secondly, the air draws heat off the hot walls of the combustion chamber during its passage from the intake valves to the chamber 30. The tangential nature of the passage wall 60 and the circular peripheral wall 68 of the pre-combustion chamber 30 causes the air to undergo a tumbling motion in the pre-combustion chamber 30. The heating of the air and tumbling motion of the air in the pre-combustion chamber enhances the mixing and break-up of the fuel particles injected into the pre-combustion chamber from the fuel injector. The larger diameter of the pre-chamber (as compared to prior art for the same pre-chamber volume) allows more airborne burning of the fuel before the fuel plume hits the opposite wall, promoting faster and cleaner combustion with less noise and emissions and improved fuel economy.

The glow plug 36 is actuated as needed. At sufficient compression and temperature, the fuel-air mixture within the pre-combustion chamber ignites. The increased effective compression ratio allows for earlier ignition and allows for ignition with the presence of less fuel. This resulting smaller explosion reduces the initial diesel knock commonly associated with diesel engines and increases the fuel efficiency during idle. Furthermore, the earlier ignition allows time for the fuel injector to introduce fuel into the pre-chamber after the initial ignition. The initial ignition with less fuel and the introduction of fuel after the initial ignition provides for a quieter smoother burn.

The combustion proceeds with the hot combustion mixture passing back down through the passage 60 and aimed toward the main combustion chamber 44 where the combustion or burn continues. The shallow or acute angle of the longitudinal axis 66 at lower end 62 alleviates the torch like effect of previous pre-combustion chambers. The flame front as it leaves the lower end 62 of transfer passage 60 enters into the passage section 28.

The diverging walls 23 have the same horizontal taper as the horizontal taper of the transfer passage 60 as illustrated in FIG. 3. The diverging walls 23 allows for the flame front to pass to the recessed lobes 20 and 22. A diverging wedge section 72 is aligned with the center line of passage section 28 to divide the flame front to swirl into each lobe section 20 and 22. The swirl is clockwise in lobe 22 and counter clockwise in lobe 20 as shown in FIG. 3. The recessed area 19 including the lobes 20 and 22, and the passage section 28 provide for the active combustion chamber 44 in which the early main combustion occurs before the piston 18 significantly moves downwardly opening up squish areas 31.

The decreased initial ignition may help to lag and extra trap volumetric efficiency along with normally retarded injection forming, in some cases, eliminate the need for piston cooling oil jets which produces significant savings in both engine production costs and engine operating costs. It provides for some of the burn to occur after the piston reaches top dead center and moves down away from the passage 60, thus, the thermal loading on the piston surface 46 is decreased. It is known that piston cooling oil jets contribute to increase ring and piston friction as well as oil consumption. The elimination of the cooling jets can provide for improved piston oil drainage and reduced oil consumption. Secondly, the oil pump may be reduced in size and the power demand of the oil pump is reduced. A significant increase in power, fuel efficiency and a decrease in specific NOx and HC, ring and cylinder wall wear, and weight are a result of applicant's pre-combustion chamber and piston design which provides for more efficient combustion and reduced thermal loading.

The timing of the exhaust valve is such that its real opening position is set later in the crankshaft cycle the same amount as the advance of the intake valve or approximately 30°. As shown in FIG. 7, the real (not design or nominal) timing of the exhaust valve can be set approximately to begin opening at approximately 120° after top dead center position of the crankshaft and piston. The conventional real open duration lasts approximately 270°. For the prior art, since the exhaust valve needs to be completely closed by the time the piston reaches TDC, the real opening of the exhaust valve conventionally occurs at 90° after TDC. In applicant's invention, the exhaust valve can be closed at approximately 30° after top dead center. The later closing allows for a delayed opening of the exhaust valve to the 120° position which substantially increases the effectiveness of the power output from the power stroke of the piston, reducing the emissions and fuel consumption.

During the exhaust stroke, the exhaust valve 42 is fully open at the center line of the exhaust valve duration period. With the valve timing set to close at 30° after top dead center, the center line and full open position of the exhaust valve is delayed to crankshaft angle of 105° before top dead center. The exhaust valve 32 is fully open near the pistons fastest motion at 80°-82° before top dead center. In prior art, the exhaust valve is fully open much earlier then when the piston peaks in speed, for example near 135° before top dead center. Conventional exhaust valve lift during the maximum piston speed at the 80°-82° before top dead center angle is nowhere near its maximum which provides for a throttling effect of the exhaust flow leaving the cylinder. By delaying the valve timing 30°, the valve lift reaches its maximum at approximately 105°. As such, during the pistons maximum speed, the valve is lifted much more because it is much closer to its maximum lift. This better matching of piston maximum speed with the maximum lift of the exhaust valve lessens the flow resistance to provide the exhaust flow to efficiently leave the cylinder particularly during high speed operation of the engine.

The combination of the side pre-combustion chamber, piston with recessed valve-receiving pockets and earlier intake valve opening and earlier intake valve closing in combination with later exhaust valve opening and later exhaust valve closing provides for a diesel engine which operates more smoothly, cleanly, and more fuel efficient. In all cases, startability and emissions during and immediately following cold start are greatly improved.

Variations and modifications are possible without departing from the scope and spirit of the present invention as defined by the appended claims.

The embodiments in which an exclusive property or privilege is claimed are defined as follows:

1. In an internal combustion engine having a cylinder and a piston movably disposed in said cylinder for reciprocal motion, a cylinder head secured over said cylinder and piston to form a combustion chamber, an intake port extending through said cylinder head and an intake valve operably mounted in said intake port for allowing air to be admitted into said combustion chamber, an exhaust port extending through said cylinder head and an exhaust valve operably mounted in said exhaust port for allowing exhaust gases to exit said combustion chamber; the improvement characterized by.

a pre-combustion chamber having a tapered transfer passage communicating with said combustion chamber with a narrow open end of said passage being in proximity to said pre-combustion chamber and a wide open end of said transfer passage being in proximity to said combustion chamber;

said tapered transfer passage having a longitudinal axis acutely angled with respect to an upper surface of said piston;

said piston having a recess in a top surface thereof;

said recess having a valve receiving section being sized and positioned such that when said respective valve is in a partially open position and when said piston is at or near TDC, said respective intake or exhaust valve is received in said valve receiving section.

2. An internal combustion engine as defined in claim 1 further characterized by:

said recess including a passage section that extends from said valve receiving section to a position in proximity directly under said wide open end of said transfer passage to receive gases exiting said pre-combustion chamber through said transfer passage and to deliver said gases to said valve receiving section.

3. An internal combustion engine as defined in claim 1 further characterized by:

said piston having a recess in a top surface thereof, said recess having said valve receiving section including a plurality of lobes with each lobe sized and positioned such that when said respective valve is in a partially open position and when said piston is at or near TDC, said respective intake and exhaust valve is received in said respective lobe.

4. An internal combustion engine as defined in claim 3 further characterized by:

said recess including a passage section that extends from said lobes to a position in proximity directly under said wide open end of said transfer passage to receive gases exiting said pre-combustion chamber through said transfer passage and to deliver said gases to the lobes.

5. An internal combustion engine as defined in claim 4 further characterized by:

said passage section being tapered with a narrow section aligned under said transfer passage and a wide section interposed between said lobes;

said lobes having a rounded apex section for dividing gas flow from said passage section into two swirling gas flows, one swirling gas flow being directed into one lobe and swirling in one direction and a second swirling gas flow being directed into the other lobe and swirling in an opposite direction from said direction in said one lobe.

6. An internal combustion engine as defined in claim 5 further characterized by:

said pre-combustion chamber having a generally disc like shape with a circular cross-sectional periphery and substantially flat vertical side walls, said tapered transfer passage having its narrow open end connected to said pre-combustion chamber through said circular periphery.

7. An internal combustion engine as defined in claim 6 further characterized by:

a fuel injector mounted to said periphery of said pre-combustion chamber at an angle between approximately 30° from the vertical up to approximately 130° from vertical.

8. An internal combustion engine as defined in claim 1 further characterized by:

said pre-combustion chamber having a disc like shape with circular vertical cross-sectional periphery and substantially flat vertical side walls, said tapered transfer passage having its narrow open end connected to said pre-combustion chamber through said circular periphery.

9. An internal combustion engine as defined in claim 8 further characterized by:

said pre-combustion chamber defined in part in a cup insert that includes two upright flanges that define the flat side walls of said pre-combustion chamber, said cup insert received in a bore in said cylinder head.

10. An internal combustion engine as defined in claim 9 further characterized by:

a fuel injector mounted to said periphery of said pre-combustion chamber at an angle between approximately 30° from the vertical up to approximately 130° from the vertical.

11. An internal combustion engine as defined in claim 8 further characterized by:

a fuel injector mounted to said periphery of said pre-combustion chamber at an angle between approximately 30° from the vertical up to approximately 130° from the vertical.

12. In an internal combustion engine having a cylinder and a piston movably disposed in said cylinder for reciprocal motion, a cylinder head secured over said cylinder and piston to form a combustion chamber, an intake port extending through said cylinder head and an intake valve operably mounted in said intake port for allowing air to be admitted into said combustion chamber, an exhaust port extending through said cylinder head and an exhaust valve operably mounted in said exhaust port for allowing exhaust gases to exit said combustion chamber; the improvement characterized by:

a pre-combustion chamber having a transfer passage communicating with said combustion chamber with a first end of said passage being in proximity to said pre-combustion chamber and an opposite second end of said transfer passage being in proximity to said combustion chamber;

said transfer passage having a longitudinal axis acutely angled with respect to an upper surface of said piston;

said pre-combustion chamber having a generally disc like shape with a circular cross-sectional vertically oriented periphery and substantially flat side vertical walls, said transfer passage having its first end connected to the pre-combustion chamber through said circular periphery.

13. An internal combustion engine as defined in claim 12 further characterized by:

said pre-combustion chamber defined in part in a cup insert that includes two upright flanges that define the flat side walls of said pre-combustion chamber, said cup insert received in a bore in said cylinder head.

14. An internal combustion engine as defined in claim 13 further characterized by:

a fuel injector mounted to said periphery of said pre-combustion chamber at an angle between approximately 30° from the vertical up to approximately 130° from the vertical.

15. An internal combustion engine as defined in claim 12 further characterized by:

a fuel injector mounted to said periphery of said pre-combustion chamber at an angle between approximately 30° from the vertical and up to approximately 130° from the vertical.

16. An internal combustion engine a defined in claim 12, further characterized by:

a fuel injector mounted to said periphery of said combustion chamber at an angle such that its nozzle is higher than its inlet, said angle between 90° and approximately 130° from the vertical.

17. A piston for an internal combustion engine, the piston characterized by:

said piston having an upper surface;

said upper surface of said piston having a recess;

said recess having a valve receiving section including a plurality of lobes with each lobe being sized to fit a respective intake and exhaust valve when said piston is installed in an engine and said respective valve is in a partially open position and when said piston is at or near TDC;

said lobes connected to a common passage section that extends from said lobes to a position in proximity directly under a wide open end of a transfer passage of a pre-combustion chamber to receive gases exiting said pre-combustion chamber through said transfer passage and to deliver said gases to both of said lobes;

said passage section being tapered with a narrow section aligned under said transfer passage and a wide section commonly connected to each lobe.

18. In an internal combustion engine having a cylinder and a piston movably disposed in said cylinder for reciprocal motion, a cylinder head secured over said cylinder and piston to form a combustion chamber, an intake port extending through said cylinder head and an intake valve operably mounted in said intake port for allowing air to be admitted into said combustion chamber, an exhaust port extending through said cylinder head and an exhaust valve operably mounted in said exhaust port for allowing exhaust gases to exit said combustion chamber; the improvement characterized by:

said piston having an upper surface;

said upper surface of said piston having a recess;

said recess having a valve receiving section being sized and positioned such that when said piston is installed in an engine and said respective valve is in a partially open position and when said piston is at or near top dead center, said respective intake and exhaust valve is received in said valve receiving section;

said intake valve being operably mounted in said engine to open when said piston is approximately 30° before top dead center and to have a real duration of approximately 270°; and said exhaust valve being operably mounted in said engine to open at approximately 120° after top dead center and to close when said piston is approximately 30° after top dead center for said real open duration being approximately 270°.

19. An internal combustion engine as defined in claim 18 further characterized by:

a pre-combustion chamber having a transfer passage communicating with said combustion chamber with a first end of said passage being in proximity to said pre-combustion chamber and an opposite second end of said transfer passage being in proximity to said combustion chamber;

said transfer passage having a longitudinal axis acutely angled with respect to an upper surface of said piston.

20. An internal combustion engine as defined in claim 19 further characterized by:

said pre-combustion chamber having a disc like shape and a circular cross-sectional periphery and substantially flat vertical side walls, said transfer passage having its first end connected through said circular periphery.

21. An internal combustion engine as defined in claim 19 further characterized by:

said pre-combustion chamber defined in part in a cup insert that includes two upright flanges that define the flat side walls of said pre-combustion chamber, said cup insert received in a bore in said cylinder head.

22. An internal combustion engine as defined in claim 21 further characterized by:

a fuel injector mounted to said periphery of said pre-combustion chamber at an angle between approximately 60°-70° from the vertical up to approximately 130° from the vertical.

23. An internal combustion engine as defined in claim 21 further characterized by:

said pre-combustion chamber defined in part in a cup insert that includes two upright flanges that define the flat side walls of said pre-combustion chamber, said cup insert received in a bore in said cylinder head.

24. An internal combustion engine as defined in claim 18 further characterized by:

said valve receiving section including a plurality of lobes with each lobe sized and positioned such that when said respective valve is in a partially open position and when said piston is at or near top dead center, said respective intake and exhaust valve is received in said respective lobe.

25. An internal combustion engine a defined in claim 21, further characterized by:

a fuel injector mounted to said periphery of said combustion chamber at an angle such that its nozzle is higher than its inlet, said angle between 90° and approximately 130° from the vertical.

* * * * *